Patented Mar. 24, 1936

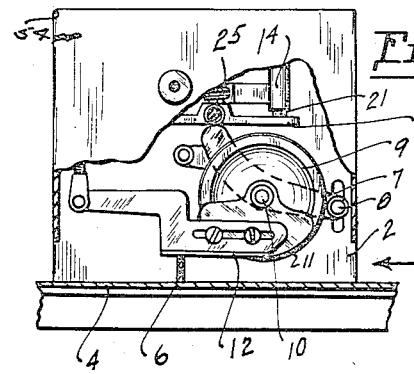
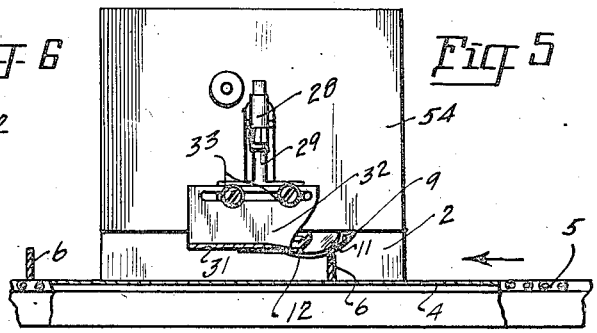
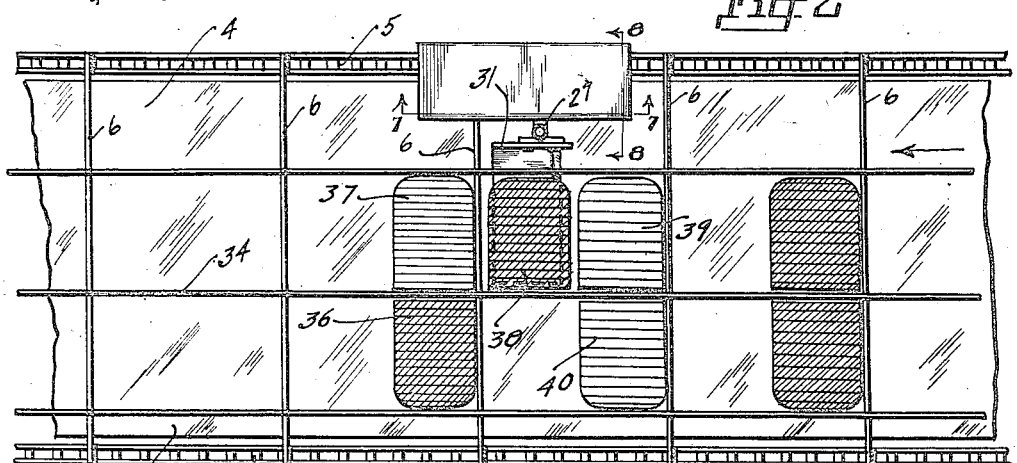
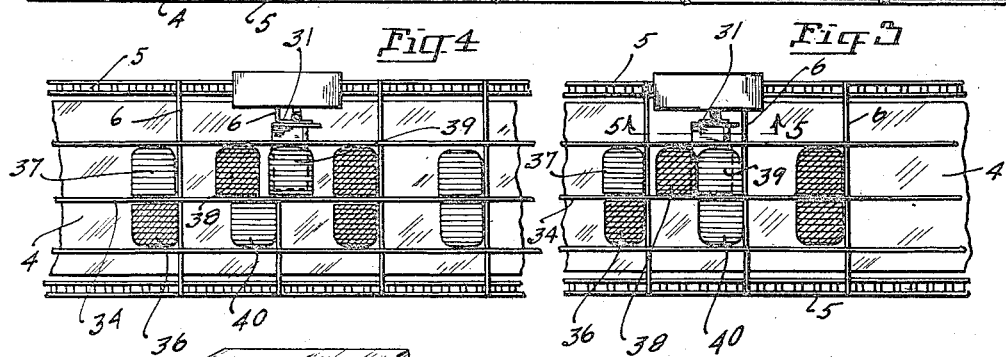
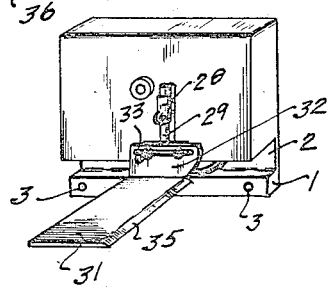
Inventor
Herbert C. Rhodes
By Thomas Bilyeu
Attorney

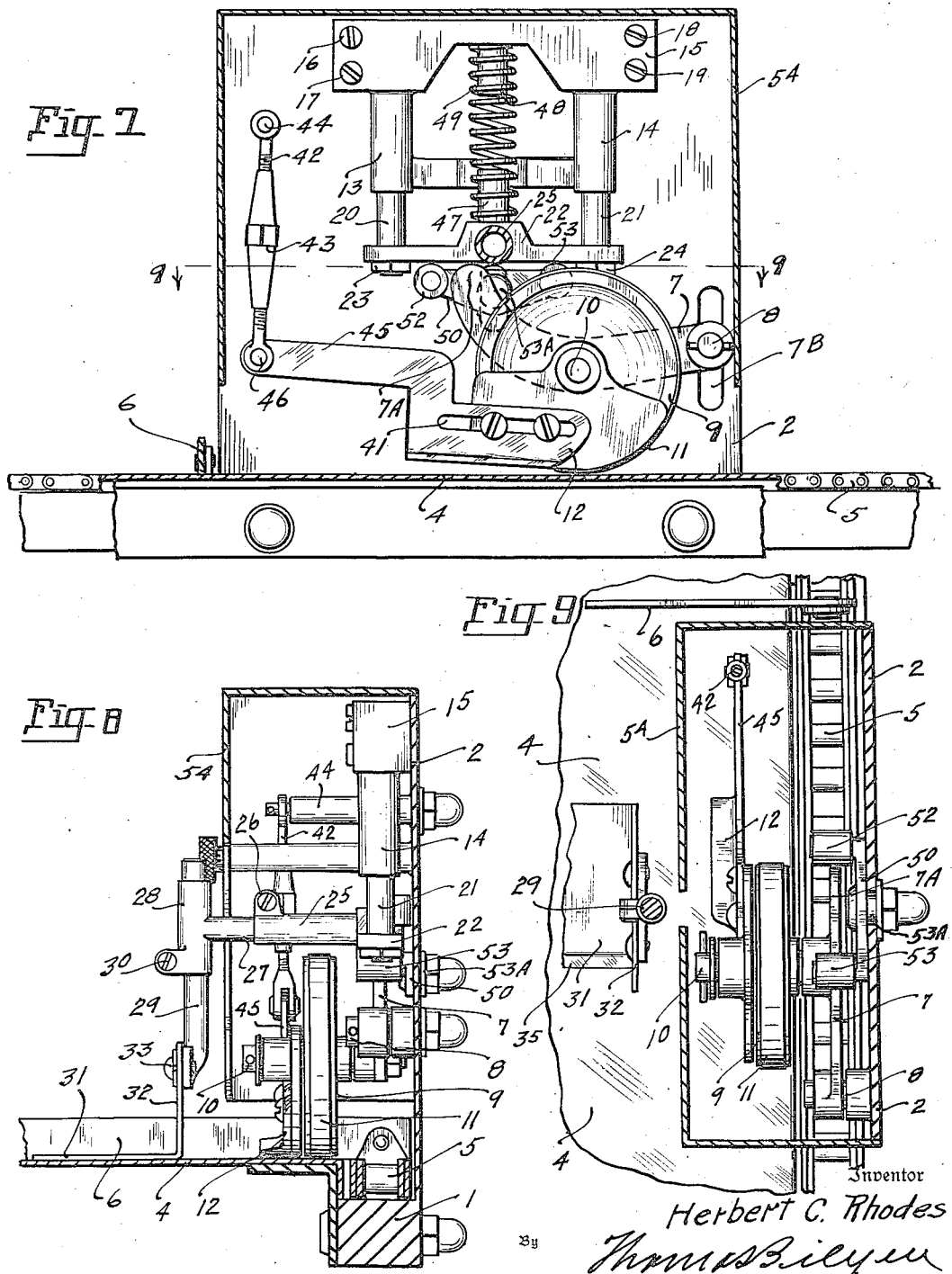

2,034,772

UNITED STATES PATENT OFFICE 2,034,772

LOAF DIVIDER

Herbert C. Rhodes, Portland, Oreg.

Application November 19, 1932, Serial No. 643,517

2 Claims. (Cl. 146—153)

My invention relates to devices that are adapted for being removably attached to bread slicing machines and for bread slicing and wrapping machines.

The device is placed between the slicing machine and the wrapping machine and has for its purpose and object the placing in one wrapper of slices of different kinds of bread, as slices of whole wheat and slices of white bread.

The invention is comprised primarily of a frame and housing adapted for being secured to the apron of the slicing machine and for being operated in conjunction therewith.

In order for my invention to be effective it is necessary that alternate loaves of the different kinds of bread to be wrapped are placed and run through the slicing machine. When so adapted it will separate the sliced loaf into two definite divisions and will place the division of one loaf in registry with the division of another loaf in order that a composite loaf composed of two kinds will be delivered to the wrapping machine automatically.

I place a wheel and shoe within the frame and hinge the same relative thereto.

A lifter is adapted to the shoe and when the part loaf, to be placed out of registry with its companion and of which it forms a component part before being sliced, is placed in registry with a part loaf of unlike material, the lifter head is so constructed that it will work in conjunction with the delivery apron and the conveyor conducting the sliced bread from the slicer to the wrapping machine.

Through the use of my new and improved device slices comprising the unit loaf to be delivered to the wrapping machine are made of equal sizes and thickness and finally combine into a sliced loaf of normal size.

The primary purpose and object of my invention is to provide a device that is adapted to the conveyor disposed between the slicing machine and the wrapping machine and deliver to the wrapping machine a composite loaf comprised of different kinds of sliced bread.

A further object of my invention consists in providing automatic means that is comprised of few parts and that may be adapted to machines now in common use in bakeries, that will deliver composite loaves of sliced material to the wrapping machine continuously and without added expense other than of its first cost and a very limited amount of power that is required to operate the same.

A still further object of my invention consists in so constructing the device that it will be comprised of few parts and one that will have a long and useful life, with practical freedom from operating annoyances.

A still further object of my invention consists in providing a method of handling bread that will deliver a composite loaf comprised of a plurality of slices of different kinds of bread.

With these and incidental objects in view, the invention and the method consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a perspective inside, side view of the assembled device.

Fig. 2 is a fragmentary, top, plan view of the conveyor apron that conducts sliced bread from the slicing machine and in this view is shown a top plan view of my assembled device.

Fig. 3 is a fragmentary top plan view of the mechanism illustrated in Fig. 1, but in this view is shown a part loaf of sliced bread being placed upon the lifter and a like part loaf disposed in registry alignment therewith.

Fig. 4 is a fragmentary, top, plan view of the conveyor and illustrates the second operation and in which the slices of a composite loaf are placed in registry alignment with each other and in position for being delivered to the wrapping machine.

Fig. 5 is a sectional, side view of the assembled device and a fragmentary, sectional side view of the conveyor. This view is taken on line 5—5 of Fig. 3, looking in the direction indicated.

Fig. 6 is an inside, side view of the assembled device and illustrates the device partially broken away to better illustrate the construction of my device. In this view the lifter is shown raised to facilitate the cross bar of the conveyor passing beneath the lifter.

Fig. 7 is a sectional, inside, side view of the assembled device. This view is taken on line 7—7 of Fig. 2, looking in the direction indicated.

Fig. 8 is a sectional end view of the assembled device. This view is taken on line 8—8 of Fig. 2, looking in the direction indicated.

Fig. 9 is a sectional, plan view of the assembled device. This view is taken on line 9—9 of Fig. 7, with parts broken away for convenience of illustration, looking in the direction indicated.

Like reference characters refer to like parts throughout the several views.

My device is comprised of a frame and the frame is comprised of base bar 1 and an upwardly extending side wall 2. The base bar 1 has a plurality of fastening holes 3 extending transversely thereof and through which fastening bolts are made to pass to adapt the same to the conveyor or apron for conducting sliced bread from a slicing machine and for delivering the same to a wrapping machine. The apron platform 4 of the conveyor has a conveyor chain 5 running therearound. The conveyor chain 5 has a plurality of spaced cross strips 6 disposed transversely of the chain and extending transversely of the apron or the table over which and about which the conveyor chain passes.

An arm 7 is hingedly secured to the frame and is hingedly journaled about any suitable journal roller 8. A rubber tired wheel 9 is supported upon a pin 10. The pin 10 is secured to the arm 7. A rubber tire 11 of wheel 9 normally runs upon the apron platform 4 and when the cross bar engages the wheel the rubber tire 11 of the wheel is raised, and simultaneously with the raising of the wheel, a shoe 12 also engages the top surface of the cross bar and is maintained in a raised position until the cross bar has passed entirely thereunder. A pair of guideways 13 and 14 are spaced apart and disposed vertically within the frame and the guideways are secured to a cross yoke 15, and downwardly depend therefrom. The yoke and guide assembly are secured to the frame by any suitable fastening means, as by the passing of screws 16, 17, 18 and 19, disposed at the oppositely disposed ends of the cross bar 15. Guide bars 20 and 21 are reciprocably disposed within the guideways 13 and 14, and a base bar 22 is secured to the guide bars 20 and 21 and the same is fastened thereto by fastening nuts 23 and 24, that are threadably attached to the lower end of the guide bars 20 and 21.

A split sleeve 25 outwardly extends from the center of the base bar 22 and a clamping screw 26 passes through ears that upwardly extend from the one side of the clamping sleeve and facilitates the clamping of a shaft 27 within the sleeve. The shaft 27 carries a clamping head 28 at its outer end.

A shoe support 29 is adjustably disposed within the clamping head 28 and is positionable within the clamping head and is adapted for being maintained in placed position through the clamping action of a screw 30. A lifter 31 is adapted for normally resting directly upon the apron platform 4 and the lifter bar bent at right angles to form an upwardly extending leg 32. The leg 32 is secured to the shoe support as through the use of a fastening screw 33. The lifter bar 31 may be positioned as to height, relative to the clamping head 28 and the lifting bar may be moved toward or away from the split sleeve 25 and clamped in placement through the action of clamping screw 26.

The loaves to be sliced are placed within the slicing machine and the sliced loaves emanating from the slicing machine are divided by a dividing bar 34 to divide the sliced loaves into sliced units of the desired size, and the sliced loaves come from the slicing machine and upon the apron platform in alternate loaves of light and dark bread and are delivered to the wrapping machine as a composite loaf comprised of part of one kind and part of another kind of bread, or other sliced material.

The lifter has a sloping front engaging edge 35, and as that portion of the loaf approaches the lifter bar that is disposed upon the lifter side of the dividing bar 34, that portion of the loaf disposed on that side of the dividing bar is placed upon the lifter bar and the cross bar engages the wheel 9 and the lifter bar is lifted sufficiently to permit the cross bar 6 to pass therebeneath this and the cross bar 6 carries that portion 36 in registry with the portion of the white bread 37 that was placed in the initial position and thereafter a divided loaf passes along as is described by referring to Fig. 2.

As that portion 36 of the loaf was carried beneath the lifter bar by the cross bar 6, the portion 38 of the dark loaf was held raised by the lifter bar, and when the portion 39 of the sliced loaf engages the portion 38, the portion 38 disposed upon the lowered lifter bar is carried along by the engagement of the part loaf 39 with the part loaf 38, and removes the part 38 from the lifter bar and the part 39 is placed thereupon.

Immediately after the delivering of the part loaf 39 upon the lifter bar, the wheel 9 engages the cross bar 6 and the loaf portion 40 is then placed in registry with the loaf portion 38. This operation continues to place a composite loaf, comprised of a portion of the adjacent loaves to deliver a composite loaf to the wrapping machine.

In order that the shoe 12 may be placed in desired position to meet the requirements of the width of different loaves, a slot 41 is placed within the shoe and a suspending link 42, having a turned buckle 43 disposed therein is hingedly disposed to the frame about a supporting pin 44 the lower or free end of the link is hingedly secured to the arm 45 of the shoe by a wrist pin 46. The base bar 22 has an upwardly extending lug 47 and the cross yoke 15 has a downwardly extending lug 48. The lugs 47 and 48 have a common center line and a reacting element, as a coil spring 49 rests upon its respective ends about the lugs 47 and 48. This reacting element normally maintains the base bar 22 in a full lowered position.

The cam face 7A of the arm 7, contacts the under surface of the bar 22, and actuates the bar 22 up and down which raises and lowers the lifter 31.

A yoke 50 is provided, and is secured to the rear of the case 2 by a bolt 50A which is adjustable up and down in a slot 50B. The yoke 50 carries rubber bumpers 52 and 53 which support the base bar 22 in its normal lowered position. The position of this yoke in the slot 50B determines the full lowered position of the lifter 31. The arm 7 is adjustable relative to the frame by using slot 7B.

A cover plate 54 is adapted to the assembly and prevents foreign matter from getting into the working parts of the mechanism.

While the form of mechanism herein shown and described is admirably adapted to fulfill the objects primarily stated, it is to be understood that it is not intended to confine the invention to the one form of embodiment herein shown and described, as it is susceptible of embodiment in various forms, and in various methods, all coming within the scope of the claims which follow.

What I claim is:

1. The combination with an endless conveying mechanism for conveying completely sliced loaves of bread, said mechanism having a table portion and a plurality of flights movable over said table portion each engageable with a loaf of bread to move the same along said table portion, of means extending longitudinally of said table above said flights for dividing the loaf of sliced bread being moved by each flight into a plurality of parts, each having a plurality of slices, means for bodily transferring one of said loaf parts from a position in front of the flight to a position rearwardly thereof, said last mentioned means including a movable plate normally resting on said table between a pair of flights to receive one of said loaf parts by the conveying action of the adjacent flight and to support said part, a vertically movable member connected with said plate, a cam link pivotally supported at one end and slidably engageable at the other end with said movable member, a wheel rotatably mounted on said cam link and disposed to normally engage said table, and a shoe connected with said cam link and being disposed to engage with said flights and be lifted thereby whereby to raise said loaf part lifting plate to permit the flights to pass beneath said plate.

2. The combination with an endless conveying mechanism for conveying completely sliced loaves of bread, said mechanism having a table portion and a plurality of flights movable over said table portion each engageable with a loaf of bread to move the same along said table portion, of means extending longitudinally of said table above said flights for dividing the loaf of sliced bread being moved by each flight into a plurality of parts, each having a plurality of slices, means for bodily transferring one of said loaf parts from a position in front of the flight to a position rearwardly thereof, said last mentioned means including a movable plate normally resting on said table between a pair of flights to receive one of said loaf parts by the conveying action of the adjacent flight and to support said part, a vertically movable member connected with said plate, spring means yieldably urging said movable member toward its lowermost position, a cam link pivotally supported at one end and slidably engageable at the other end with said movable member, a wheel rotatably mounted on said cam link and disposed to normally engage said table, and a shoe connected with said cam link and being disposed to engage with said flights and be lifted thereby whereby to raise said loaf part lifting plate to permit the flights to pass beneath said plate.

HERBERT C. RHODES.